(12) United States Patent
Chinone

(10) Patent No.: US 10,379,770 B2
(45) Date of Patent: Aug. 13, 2019

(54) STORAGE SYSTEM AND COMMUNICATING METHOD

(71) Applicant: NEC Corporation, Minato-ku, Tokyo (JP)

(72) Inventor: Yuko Chinone, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/926,067

(22) Filed: Mar. 20, 2018

(65) Prior Publication Data

US 2018/0275906 A1    Sep. 27, 2018

(30) Foreign Application Priority Data

Mar. 27, 2017  (JP) .................................. 2017-061121

(51) Int. Cl.
   *G06F 3/06* (2006.01)

(52) U.S. Cl.
   CPC ............ *G06F 3/0635* (2013.01); *G06F 3/067* (2013.01); *G06F 3/0611* (2013.01); *G06F 3/0661* (2013.01)

(58) Field of Classification Search
   CPC .... G06F 3/0611; G06F 3/0635; G06F 3/0658; G06F 3/067; G06F 3/0683
   USPC ...................... 710/33, 38; 711/154
   See application file for complete search history.

(56) References Cited

U.S. PATENT DOCUMENTS

| 6,718,444 | B1 * | 4/2004 | Hughes | G06F 13/161 |
|---|---|---|---|---|
| | | | | 710/39 |
| 2002/0172197 | A1 * | 11/2002 | Dale | H04L 12/2801 |
| | | | | 370/386 |
| 2004/0093406 | A1 * | 5/2004 | Thomas | H04L 67/1008 |
| | | | | 709/224 |
| 2004/0205143 | A1 | 10/2004 | Uemura | |
| 2007/0201434 | A1 | 8/2007 | Nakamura et al. | |
| 2013/0055371 | A1 * | 2/2013 | Kumano | H04L 67/1097 |
| | | | | 726/7 |
| 2014/0108751 | A1 * | 4/2014 | Brown | G06F 11/1464 |
| | | | | 711/162 |
| 2016/0026398 | A1 | 1/2016 | Yamashita et al. | |

FOREIGN PATENT DOCUMENTS

| JP | 2002-357418 A | 12/2002 |
|---|---|---|
| JP | 2003-085017 A | 3/2003 |
| JP | 2004-240803 A | 8/2004 |

(Continued)

OTHER PUBLICATIONS

Japanese Office Action for JP Application No. 2017-061121 dated May 7, 2019 with English Translation.

*Primary Examiner* — Gary J Portka

(57) ABSTRACT

A storage system according to the present invention includes: a plurality of storage devices, wherein each of a plurality of the storage devices including: a control unit; and a storage unit that stores data, wherein the control unit of the storage device that receives a request specifies the storage device that includes the storage unit in that target data targeted by the request is stored among a plurality of the storage devices, and the control unit of the storage device that is specified transmits, as a response to the request, the target data and header information in that a destination identifier indicating a destination of the request is set to a source identifier of the response, and a source identifier indicating a source of the request is set to a destination identifier of the response.

4 Claims, 9 Drawing Sheets

(56) References Cited

FOREIGN PATENT DOCUMENTS

| | | | |
|---|---|---|---|
| JP | 2004-280862 | A | 10/2004 |
| JP | 2013-045379 | A | 3/2013 |
| JP | 2016-024679 | A | 2/2016 |

\* cited by examiner

Fig. 4

51 STORAGE TABLE

| DATA | LOGICAL ADDRESS |
|------|-----------------|
| D0   | LA0             |
| D1   | LA1             |
| D2   | LA2             |
| D3   | LA3             |

Fig. 5

52 CONVERSION TABLE

| LOGICAL ADDRESS 511 | PHYSICAL ADDRESS 512 | |
|---|---|---|
| LA0 | PA0 | ⎫ FIRST VOLUME 35 |
| LA1 | PA1 | |
| LA2 | PA2 | ⎭ |
| LA3 | PA3 | ⎫ SECOND VOLUME 45 |
| LA4 | PA4 | |
| LA5 | PA5 | ⎭ |

STORAGE SYSTEM AND COMMUNICATING METHOD

This application is based upon and claims the benefit of priority from Japanese Patent Application No. 2017-061121, filed on Mar. 27, 2017, the disclosure of which is incorporated herein in its entirety by reference.

TECHNICAL FIELD

The present disclosure relates to a storage system and a communicating method.

BACKGROUND ART

As information is increasingly electronized, a technology for managing an enormous amount of information is attracting attention. For example, one of technologies for managing an enormous amount of information is a technology for extending performance or capacity of a storage. Specifically, there has been proposed a scale-out type storage which allocates one logical disk configured with a plurality of storages to a server. For example, as a technology relating to the scale-out type storage, Japanese Unexamined Patent Application Publication No. 2016-024679 discloses a technology for controlling an order of write access to a plurality of nodes and preventing occurrence of mismatching among mirror data.

Note that Japanese Unexamined Patent Application Publication No. 2004-280862 describes, as a technology for managing an enormous amount of information, a technology for connecting a disk array controller, disk devices, and a host by one interface in a system that implements redundant arrays of independent disks (RAID), thereby decreasing the number of interfaces among these devices and implementing low cost. Further, Japanese Unexamined Patent Application Publication No. 2003-085017 discloses a technology for storing copy data of a master disk in a remote disk. Further, Japanese Unexamined Patent Application Publication No. 2013-045379 discloses a technology for distributed arrangement of data into a plurality of storage nodes by using a technique of a key-value store (KVS).

SUMMARY

For example, when a server transmits an input/output (I/O) command to one storage among a plurality of storages and data targeted by the I/O command is stored in another storage, the targeted data are transmitted from the another storage to the one storage, and are then transmitted from the one storage to the server. Therefore, there is a possibility of increasing frequency of data communication between the storages.

Further, there is a method in which a server stores storage locations of all data when the server transmits an I/O command to a storage that stores data targeted by the I/O command. In this case, however, the server needs to perform an operation of specifying the storage to which the I/O command is to be transmitted, from the stored storage locations of the data. In other words, a new function needs to be added to the server.

The present disclosure has been made in view of the issue described above, and provides a technology for decreasing frequency of data communication between storages without adding a new function to a server.

A storage system according to example aspect of the present invention includes: a plurality of storage devices, wherein each of a plurality of the storage devices including: a control unit; and a storage unit that stores data, wherein the control unit of the storage device that receives a request specifies the storage device that includes the storage unit in that target data targeted by the request is stored among a plurality of the storage devices, and the control unit of the storage device that is specified transmits, as a response to the request, the target data and header information in that a destination identifier indicating a destination of the request is set to a source identifier of the response, and a source identifier indicating a source of the request is set to a destination identifier of the response.

A communicating method according example aspect of the present invention is for a storage system that includes a plurality of storage devices. The communicating method includes: by a storage device, receiving a request and specifying a storage device having a storage in which target data targeted by the request are stored among the plurality of storage devices; and by the storage device that is specified, transmitting, as a response to the request, the target data and header information in that a destination identifier indicating a destination of the request is set to a source identifier of the response, and in that a source identifier indicating a source of the request is set to a destination identifier of the response.

BRIEF DESCRIPTION OF THE DRAWINGS

Exemplary features and advantages of the present invention will become apparent from the following detailed description when taken with the accompanying drawings in which:

FIG. 4 is a diagram for explaining a storage table;

FIG. 5 is a diagram for explaining a conversion table;

EXAMPLE EMBODIMENT

An example embodiment in the present disclosure will hereinafter be described in detail with reference to the drawings.

First Example Embodiment

Figure 1:
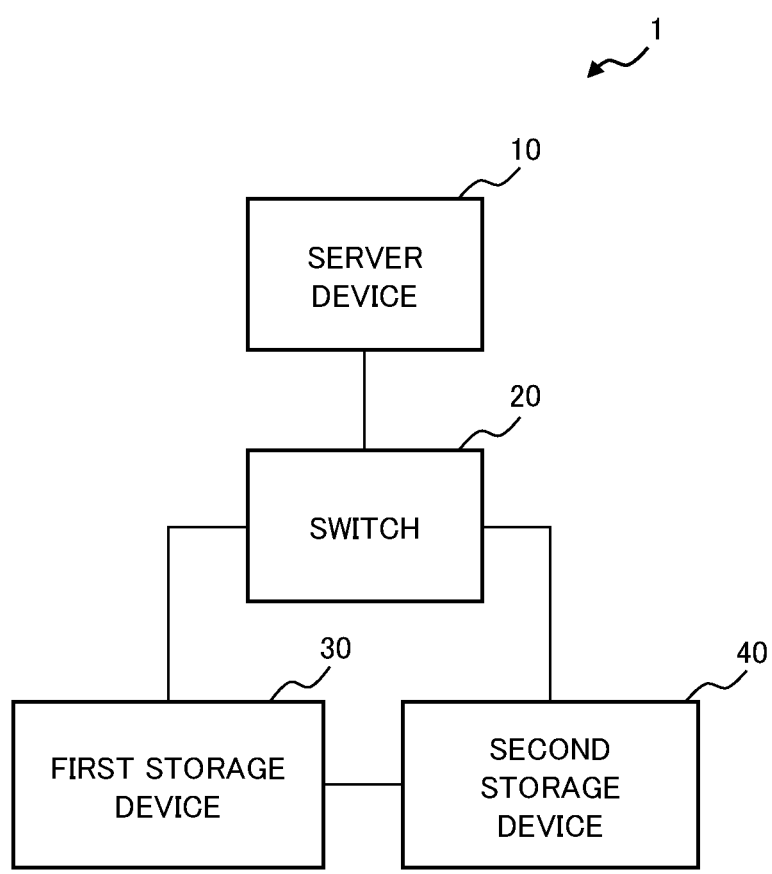
FIG. 1 is a diagram illustrating an example of an overall configuration of a storage system in a first example embodiment.

FIG. 1 is a diagram illustrating an example of an overall configuration of a storage system 1 according to a first example embodiment. The storage system 1 includes a server device 10, a switch 20, a first storage device 30, and a second storage device 40. The switch 20 is implemented by, for example, a fiber channel (FC) switch.

The server device 10 and the switch 20 are mutually connected via a wired or wireless network. Further, the server device 10 communicates data with each of the storage devices via the switch 20.

The switch 20 is connected to the first storage device 30 and the second storage device 40 via an FC. Further, the first storage device 30 and the second storage device 40 are mutually connected via a wired or wireless network.

In FC communication, one sequence (data) is transported by using one or a plurality of frames. At this time, a reception side can recognize that transport of a series of frames is completed, by receiving a frame (a last frame) that includes a last data row.

Figure 2:
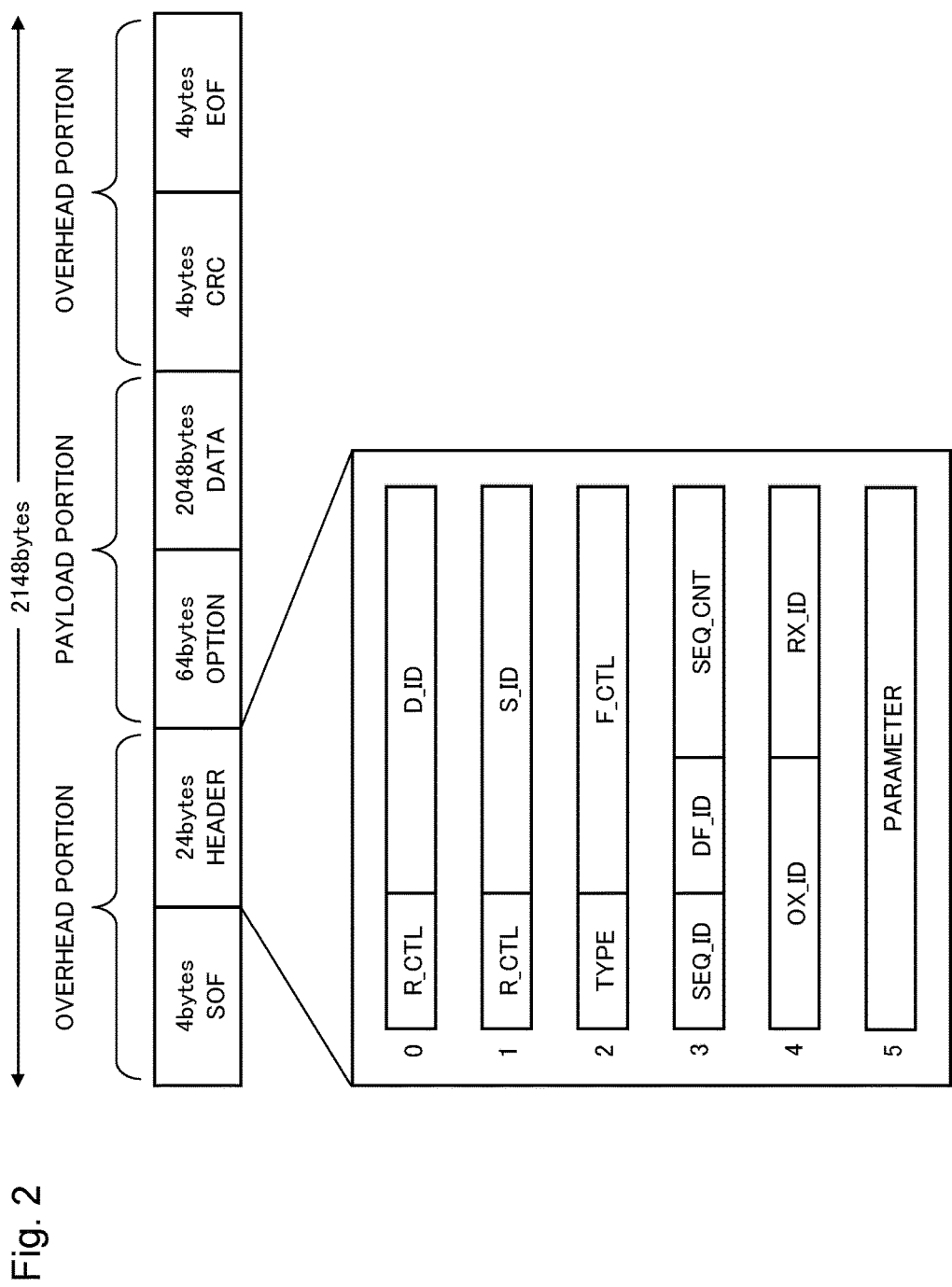
FIG. 2 is a diagram for explaining a frame.

FIG. 2 is a diagram for explaining a header (header information) of a frame. As illustrated in FIG. 2, the frame has a variable length up to 2148 bytes and is configured with an overhead portion of 36 bytes and a payload portion of 2112 bytes. The overhead portion indicates a start of frame (SOF) of 4 bytes which is attached to a start, a header of 24 bytes, an end of frame (EOF) of 4 bytes which is attached to an end of the frame, and a cyclic redundancy check (CRC) of 4 bytes. Further, the payload portion indicates an option of 64 bytes and data of 2048 bytes. Note that, the CRC indicates a code for checking an error. In the header of a frame, a header of a frame that is to be used in the following description will be described.

A Destination_Identifier (D_ID) is a destination address (which is also called a destination identifier), and is, for example, a port address of a destination of the frame.

A Source_Identifier (S_ID) is a source address (which is also called a source identifier), and is, for example, a port address of a source of the frame.

A Frame_Control (F_CTL) is a value representing an attribute of an exchange or a sequence, such as a head frame, a last frame, or whether a transmission side is an originator or a responder.

A Sequence_Identifier (SEQ_ID) is a number unique to each sequence, for a pair of a D_ID and an S_ID. A Sequence Count (SEQ_CNT) is each of serial numbers on a plurality of frames within one sequence, or each of serial numbers on a plurality of sequences within one exchange.

An Originator Exchange_Identifier (OX_ID) is an originator identifier that identifies an originator that starts each of exchanges on an originator side (a side that transmits a frame of a command) that starts an exchange indicating a unit of transaction processing.

Note that, transaction processing indicates a series of processes performed, for example, from when a Read command is transmitted from the server device 10 to each storage device via the switch 20, until when target data of the Read command are transmitted back from each storage device to the server device 10 via the switch 20.

A Responder Exchange_Identifier (RX_ID) is an identifier that specifies each exchange on a responder side (a side that receives a frame that configures a command) that responds to the originator.

The server device 10, the first storage device 30, and the second storage device 40 determine a source and a destination based on the S_ID, the D_ID and the OX_ID, and transmit and receive data. Since the OX_ID is the originator identifier that identifies the originator that starts each exchange, the server device 10, the first storage device 30, and the second storage device 40 find our which exchange a frame is related to by the OX_ID.

For example, the server device 10 transmits a Read command to the first storage device 30. Then, the first storage device 30 transmits data targeted by the Read command to the server device 10. At this time, when an S_ID, a D_ID, and an OX_ID of the Read command transmitted by the server device 10 do not match for an S_ID, a D_ID, and an OX_ID of the data transmitted by the first storage device 30, the server device 10 determines that the Read command is abnormally processed, and does not receive the data. In other words, the server device 10 has an existing means for using an S_ID, a D_ID, and an OX_ID set in a frame, determining a relation between a destination and a source of data, and receiving the data.

Figure 3:
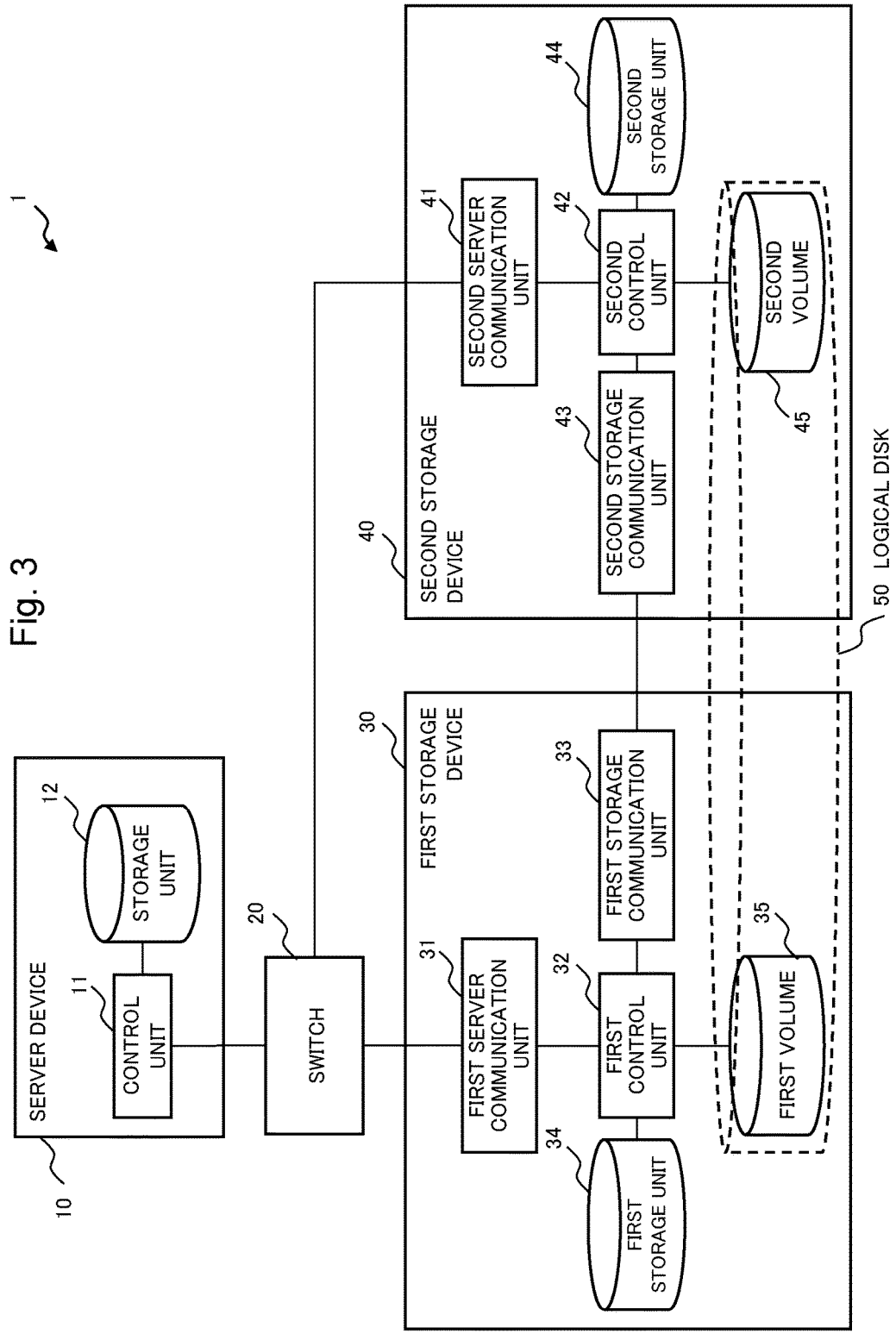
FIG. 3 is a functional block diagram illustrating an example of a configuration of the storage system in the first example embodiment.

FIG. 3 is a functional block diagram illustrating an example of a configuration of the storage system 1 in the first example embodiment. The server device 10 has a control unit 11 and a storage unit 12. The control unit 11 transmits, to the switch 20, a command that includes data or an instruction of processing to data. Further, the control unit 11 receives data from the switch 20. Further, the control unit 11 controls input process of data from the storage unit 12 and output process of data to the storage unit 12. The storage unit 12 stores data. Data targeted by an instruction will hereinafter be called target data.

The switch 20 determines a destination of the frame based on a D_ID set in a transmitted frame, and transmits the frame to the determined destination.

The first storage device 30 includes a first server communication unit 31, a first control unit 32, a first storage communication unit 33, a first storage unit 34, and a first volume 35. The second storage device 40 includes a second server communication unit 41, a second control unit 42, a second storage communication unit 43, a second storage unit 44, and a second volume 45.

The first server communication unit 31 and the second server communication unit 41 communicate data with the switch 20. The first storage communication unit 33 and the second storage communication unit 43 mutually communicate data.

Further, the first storage device 30 and the second storage device 40 construct a logical disk 50 with the first volume 35 and the second volume 45. The first storage device 30 and the second storage device 40 allocates the constructed logical disk 50 to the server device 10. Further, the logical disk 50 is also called a Logical Disk (LD). The logical disk 50 stores data.

The first storage unit 34 and the second storage unit 44 each store both of a storage table 51 illustrated in FIG. 4 and a conversion table 52 illustrated in FIG. 5. The storage table 51 and the conversion table 52 are information for managing data stored in the logical disk 50.

FIG. 4 is a diagram for explaining the storage table 51. The storage table 51 includes data 510 and a logical address 511. The data 510 is data stored in the logical disk 50. The logical address 511 is location information that indicates a storage location of the data 510 in a logical address space in the logical disk 50.

FIG. 5 is a diagram for explaining the conversion table 52. The conversion table 52 includes the logical address 511 and a physical address 512. The physical address 512 is location information that indicates a location on a physical address space relating to the logical address 511 in the first volume 35 or the second volume 45.

In FIG. 5, the logical address 511 and the physical address 512 are associated with each other. Therefore, the first control unit 32 and the second control unit 42 can specify which storage device stores the target data based on the storage table 51 and the conversion table 52. Further, the first control unit 32 and the second control unit 42 share a location of data and the like which are stored in the logical disk 50 by communicating between storages via the first storage communication unit 33 and the second storage communication unit 43. For example, when a location of data stored in the logical disk 50 is changed, the first control unit 32 updates the storage table 51 and the conversion table 52 that are stored in the first storage unit 34. Then, the first control unit 32 transmits update information of the storage table 51 and the conversion table 52 which are stored in the first storage unit 34, to the second storage device 40 via the first storage communication unit 33. The second control unit 42 receives the update information of the storage table 51 and the conversion table 52, from the first storage device 30 via the second storage communication unit 43. Then, the second control unit 42 updates the storage table 51 and the conversion table 52 which are stored in the second storage unit 44. In this way, the information in the storage tables 51 and the conversion tables 52 that are respectively stored in storage units are synchronized.

The first control unit 32 refers to the first storage unit 34 based on a Read command received from the switch 20, and specifies a storage device that stores target data. Then, when the specified storage device is any storage device other than an own device, the first control unit 32 transfers an S_ID, a D_ID, and an OX_ID included in the Read command to the specified storage device.

Figure 6:
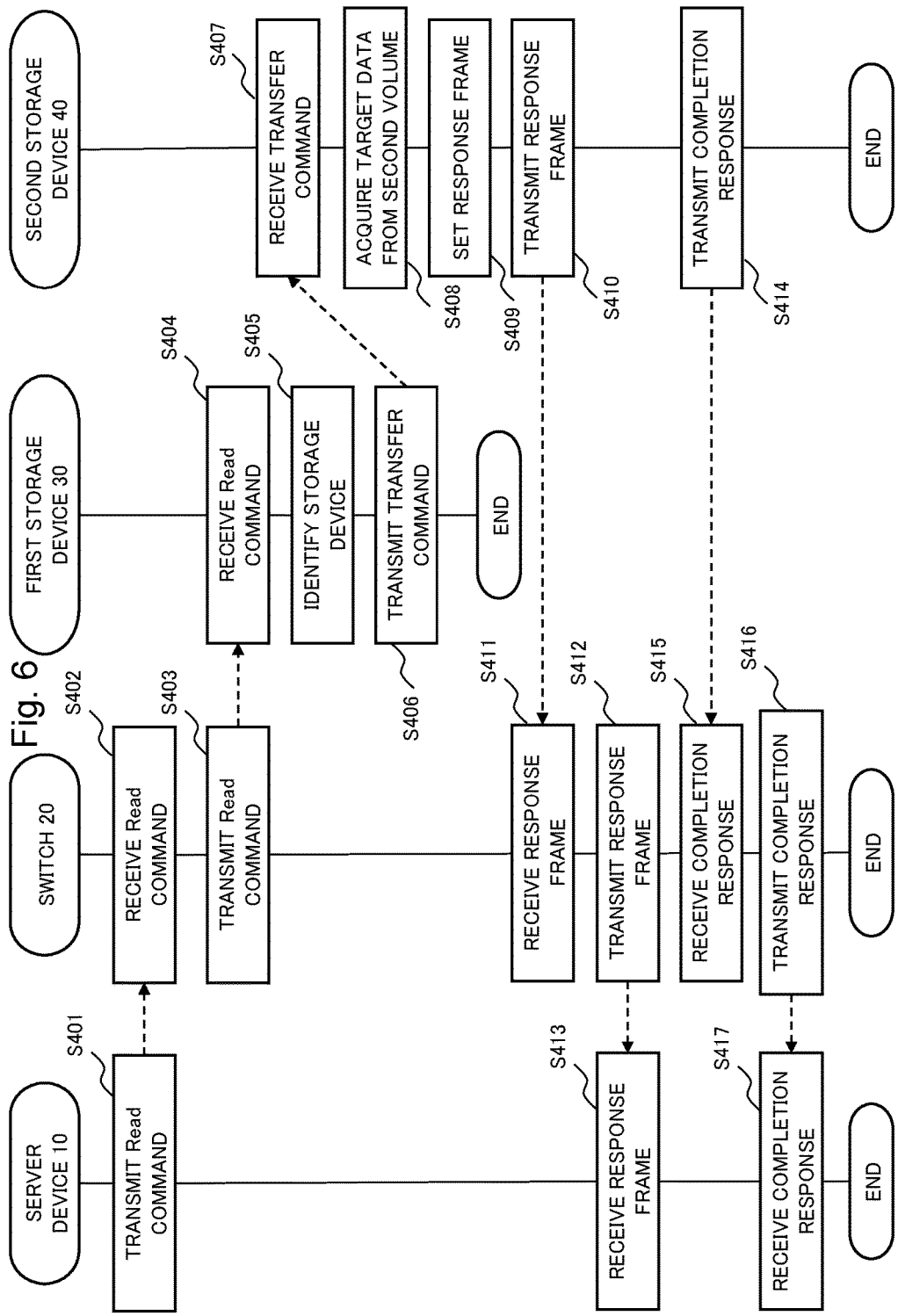
FIG. 6 is a flowchart illustrating an example of an operation of the storage system in the first example embodiment.

FIG. 6 is a flowchart illustrating an example of an operation of the storage system 1 in the first example embodiment. It is assumed that the operation shown below is an operation when the server device 10 transmits a Read command that targets data 510 "D3" stored in the second storage device 40 as target data, to the first storage device 30. FIG. 6 illustrates processing by the server device 10 on left side, and illustrates processing by the switch 20 on a right side of the processing by the server device 10. Further, FIG. 6 illustrates processing by the second storage device 40 on its right side, and illustrates processing by the first storage device 30 on a left side of the processing by the second storage device 40.

Note that, a dotted arrow between the processing by the server device 10 and the processing by the first storage device 30, and a dotted arrow between the processing by the first storage device 30 and the processing by the second storage device 40 respectively indicate flows of information.

The control unit 11 of the server device 10 transmits a Read command to read the data 510 "D3" to the switch 20, while setting the first storage device 30 as a destination (step S401). Specifically, a frame that configures the Read command includes an S_ID that indicates an address of the server device 10, a D_ID that indicates an address of the first storage device 30, an OX_ID that indicates the address of the server device 10, and an instruction to read the data 510 "D3" as target data.

The switch 20 receives the Read command from the server device 10 (step S402). Then, the switch 20 refers to the D_ID, and transmits the Read command to the first storage device 30 (step S403).

The first server communication unit 31 of the first storage device 30 receives the Read command from the switch 20 (step S404). Then, the first server communication unit 31 transmits the received Read command to the first control unit 32. The first control unit 32 receives the Read command from the first server communication unit 31.

The first control unit 32 refers to the storage table 51 and the conversion table 52 based on the received Read command, and specifies a storage device having a volume for storing the target data of the received Read command (step S405).

Specifically, the first control unit 32 refers to the storage table 51 in the first storage unit 34 by using the target data. With reference to the storage table 51 illustrated in FIG. 4, the first control unit 32 finds out that the data 510 "D3" is stored at a logical address 511 "LA3". Accordingly, the first control unit 32 acquires the logical address 511 "LA3" from the storage table 51. Then, the first control unit 32 refers to the conversion table 52 in the first storage unit 34 by using the logical address 511 "LA3". With reference to the conversion table 52 illustrated in FIG. 5, the first control unit 32 finds that the logical address 511 "LA3" is associated to a physical address 512 "PA3". Further, as illustrated in FIG. 5, the physical address 512 "PA3" indicates an address in the second volume 45. Thus, the first control unit 32 detects that the data 510 "D3" which is the target data exist in the second storage device 40. Accordingly, the storage device specified in step S405 is the second storage device 40.

Then, the first control unit 32 transmits a transfer command which includes an instruction to transfer the target data to the server device 10, and the S_ID, the D_ID, and the OX_ID which are included in the Read command, to the first storage communication unit 33. Then, the first storage communication unit 33 transmits the transfer command, and the S_ID, the D_ID, and the OX_ID that are included in the Read command (step S406) to the second storage device 40.

The second storage communication unit 43 of the second storage device 40 receives the transfer command, and the S_ID, the D_ID, and the OX_ID that are included in the Read command from the first storage device 30 (step S407). The second storage communication unit 43 transmits the transfer command, and the S_ID, the D_ID, and the OX_ID that are included in the Read command to the second control unit 42.

The second control unit 42 acquires the target data from the second volume 45 based on the received transfer command (step S408). Specifically, the second control unit 42 acquires the data 510 "D3" from the second volume 45. Then, the second control unit 42 sets a response frame which becomes a response to the Read command based on the acquired data 510 "D3" and the received S_ID, D_ID, and OX_ID (step S409).

Specifically, the second control unit 42 sets an S_ID, a D_ID, and an OX_ID in a header of the response frame, based on the S_ID, the D_ID, the OX_ID, and the transfer command which are received from the second storage communication unit 43. At this time, the S_ID set in the header of the response frame is the first storage device 30. Further, the D_ID set in the header of the response frame is the server device 10. Further, the OX_ID set in the header of the response frame is the server device 10. Then, the second control unit 42 sets the data 510 "D3" which is the target data in a payload of the response frame.

Then, the second control unit 42 transmits the response frame to the second server communication unit 41. The second server communication unit 41 receives the response frame from the second control unit 42. Then, the second server communication unit 41 transmits the response frame to the switch 20 (step S410).

The switch 20 receives the response frame from the second storage device 40 (step S411). Then, the switch 20 transmits the response frame to the server device 10 based on the response frame (step S412). Specifically, the switch 20 refers to the D_ID set in the header of the response frame, and determines a destination to which the response frame is to be transmitted. At this time, the D_ID is the server device 10, and hence the switch 20 transmits the response frame to the server device 10.

The control unit 11 of the server device 10 receives the response frame from the switch 20 (step S413). At this time, the S_ID is the first storage device 30. Further, the D_ID set in the header of the response frame is the server device 10. Further, the OX_ID set in the header of the response frame is the server device 10. Therefore, the server device 10 determines that processing related to the Read command is executed normally in the first storage device 30.

Further, the second control unit 42 sets the similar S_ID, the similar D_ID, and the similar OX_ID the response frame into a Response frame which configures a Read command completion response (mentioned below). Then, the second control unit 42 transmits the completion response to the second server communication unit 41. The second server communication unit 41 receives the completion response from the second control unit 42. Then, the second server communication unit 41 transmits the completion response to the switch 20 (step S414).

The switch 20 receives the completion response from the second storage device 40 (step S415). Then, the switch 20 transmits the completion response to the server device 10 based on the D_ID set in the Response frame which configures the completion response (step S416).

The control unit 11 of the server device 10 receives the completion response from the switch 20 (step S417). Then, the processing terminates. The completion response is a notification indicating that the processing related to the Read command has terminated. Accordingly, the control unit 11 can determine that the processing related to the Read command has terminated based on the received completion response.

Note that, although the server device 10 is connected to the two storage devices in the present example embodiment, the server device 10 may be connected to three or more storage devices.

Further, although the switch 20 and the first storage device 30, and the switch 20 and the second storage device 40, are mutually connected by an FC, they may be mutually connected by an Internet Small Computer System Interface (iSCSI) in place of the FC.

As mentioned above, since the response frame including the data 510 "D3" as the target data is transmitted from the second storage device 40 to the server device 10 via the switch 20, the second storage device 40 is set to the S_ID of the response frame in which the target data is set. However, when the second storage device 40 is set to the S_ID of the response frame in which the target data is set, the response frame is not related to the Read command transmitted by the server device 10. Therefore, even when the server device 10 receives the response frame in which the target data is set, the server device 10 fails to recognize the response frame as a response to the Read command transmitted by the server device 10.

Therefore, in order that the response frame is recognized as a response to the Read command transmitted by the server device 10, for example, it is assumed that the second storage device 40 transmits the response frame to the server device 10 via the first storage device 30. In this case, because the response frame needs to be transmitted, to the server device 10, from a storage device which is set to the D_ID of the Read command by the server device 10, there is a possibility that frequency of data communication between the storages becomes high.

Thereat, in order to pretend that the first storage device 30 sends the response frame to the server device 10, the second storage device 40 rewrites the header of the response frame based on the S_ID, the D_ID, and the OX_ID which are included in the Read command. By this way, the server device 10 receives the target data such that the target data is transmitted by the first storage device 30. Accordingly, the server device 10 does not need to execute any special action, but can execute an action as a normal Read command.

As described above, the storage system 1 according to the first example embodiment can decrease frequency of data communication between the storages without adding a new function to the server device 10.

Second Example Embodiment

Figure 7:
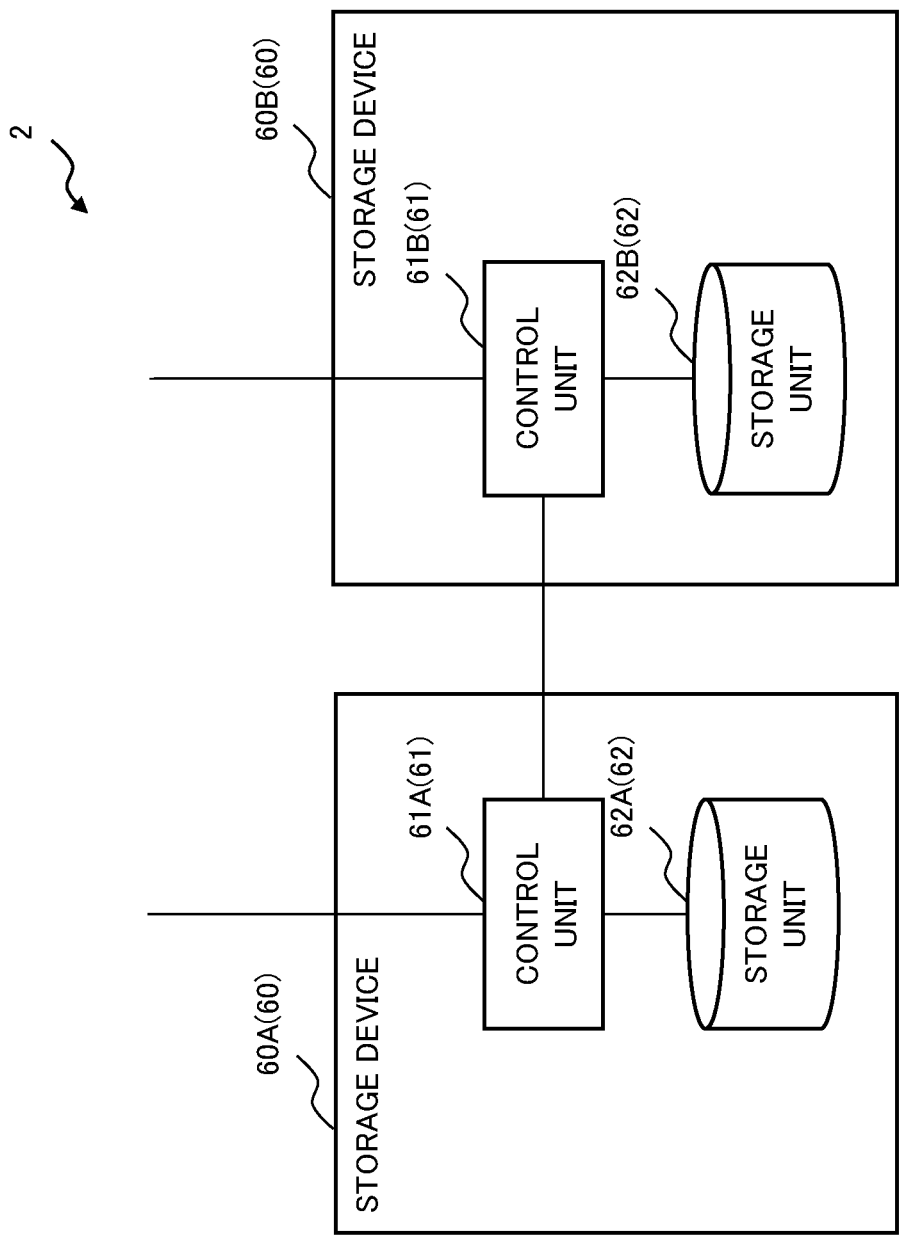
FIG. 7 is a functional block diagram illustrating an example of a configuration of a storage system in a second example embodiment.

FIG. 7 is a functional block diagram illustrating an example of a configuration of a storage system 2 according to a second example embodiment. The storage system 2 according to the present example embodiment is a minimum configuration for solving the issue to be solved by the present disclosure.

The storage system 2 includes a storage device 60A and a storage device 60B. The storage device 60A includes a control unit 61A and a storage unit 62A that stores data. Further, the storage device 60B includes a control unit 61B and a storage unit 62B that stores data. In the following explanation, when the storage device 60A and the storage device 60B are not distinguished from each other, each of these is called a storage device 60. Further, when the control unit 61A and the control unit 61B are not distinguished from each other, each of these is called a control unit 61. Moreover, when the storage unit 62A and the storage unit 62B are not distinguished from each other, each of these is called a storage unit 62.

In other words, the storage system 2 includes a plurality of storage devices 60. Further, each of the plurality of the storage devices 60 includes the control unit 61 and the storage unit 62 that stores data.

The control unit 61 of the storage device 60 that receives a request, among the plurality of the storage devices 60, specifies the storage device 60 having the storage unit 62 in which the target data targeted by the request is stored, among the plurality of the storage devices 60. The request includes a destination identifier that indicates a destination of the request, and a source identifier that indicates a source of the request.

The control unit 61 of the specified storage device 60 transmits, as a response to the request, the target data and header information in which the destination identifier that indicates the destination is set to the source identifier of the response and the source identifier that indicates the source of the request is set to the destination identifier of the response.

Figure 8:
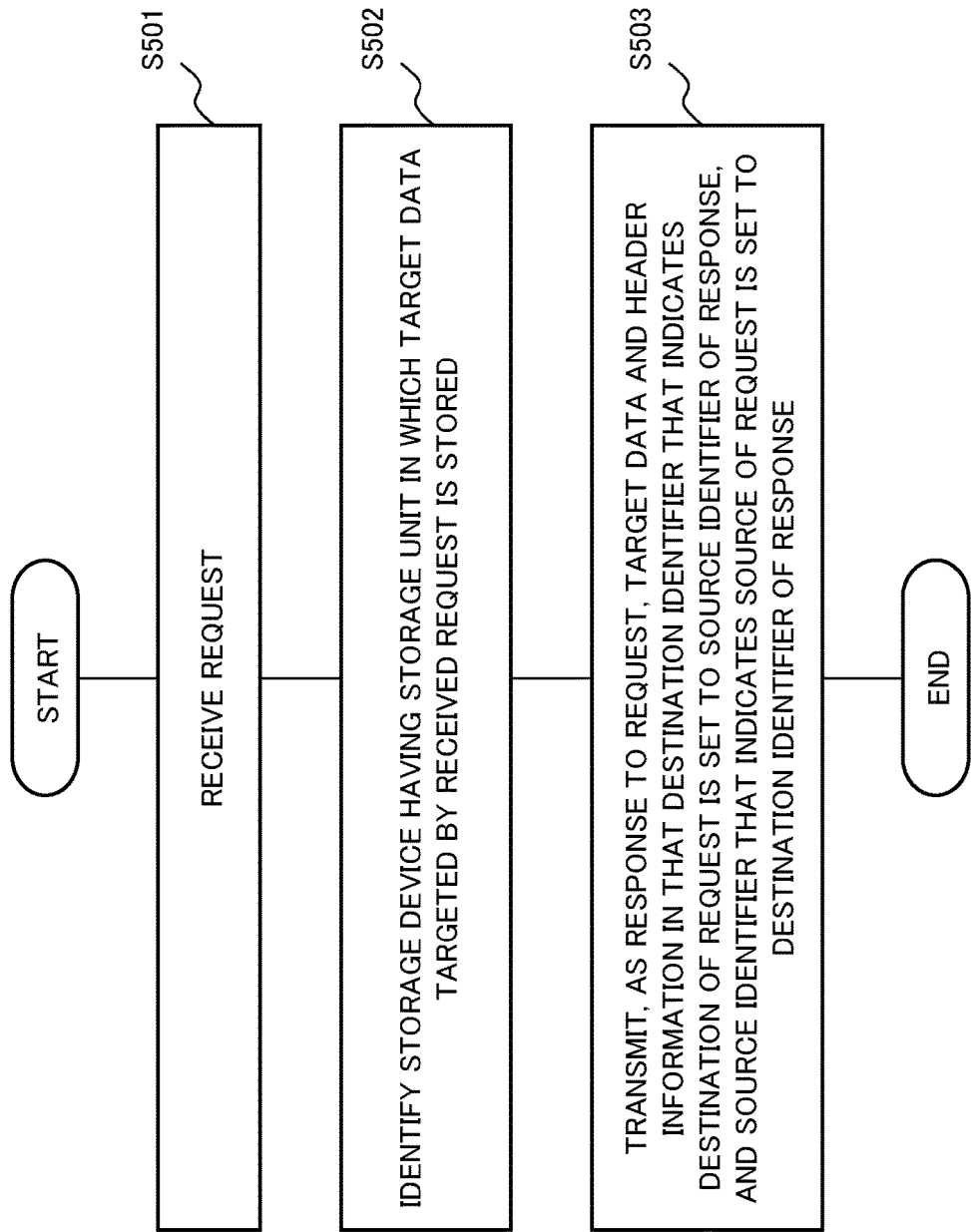
FIG. 8 is a flowchart illustrating an example of an operation of the storage system in the second example embodiment.

FIG. 8 is a flowchart illustrating an example of an operation of the storage system 2 according to the second example embodiment.

The control unit 61 of the storage device 60 that is the destination of the request, the destination is indicated by the destination identifier included in the request, among the plurality of the storage devices 60, receives the request (step S501). For example, when the destination identifier indicates the storage device 60A, the control unit 61A of the storage device 60A receives the request.

Then, the control unit 61 of the storage device 60 specifies the storage device 60 that has the storage unit 62 in which the target data targeted by the received request are stored (step S502). For example, when the target data are stored in the storage unit 62A of the storage device 60A, the control unit 61A of the storage device 60A specifies the storage device 60A in step S502. Alternatively, when the target data are stored in the storage unit 62B of the storage device 60B, the control unit 61A of the storage device 60A specifies the storage device 60B in step S502.

After that, the control unit 61 of the specified storage device 60 transmits, as a response to the request, the target data and header information in which the destination identifier that indicates the destination of the request is set to the source identifier of the response, and the source identifier that indicates the source of the request is set to the destination identifier of the response (step S503).

For example, when the storage device 60A is specified in step S502, the control unit 61A of the storage device 60A transmits, as a response to the request, the target data and header information in which information of the storage device 60A that is the destination identifier of the request is set to the source identifier of the response, and the source identifier that indicates the source of the request is set to the destination identifier of the response. The processing then terminates.

Alternatively, when the storage device 60B is specified in step S502, the control unit 61B of the storage device 60B transmits, as a response to the request, the target data and header information in which information of the storage device 60A that is the destination identifier of the request is set to the source identifier of the response, and the source identifier that indicates the source of the request is set to the destination identifier of the response. The processing then terminates.

As such, the storage device 60 having the storage unit 62 in which the target data is stored transmits, as a response to the request, the target data and header information in which the destination identifier that indicates the destination of the request is set to the source identifier of the response, and the source identifier that indicates the source of the request is set to the destination identifier of the response.

By this way, the source of the request receives the response from the storage device 60 having the storage unit 62 in which the target data are stored such that the storage device 60 that receives the request transmits the response. Accordingly, even when the source of the request recognizes that the response from the storage device 60 to which the request is transmitted is a response to the request, for example, the source of the request does not execute a special action, and can execute an action as a normal response.

As described above, the storage system 2 according to the second example embodiment can decrease frequency of data communication between the storages, without adding a new function to the source of the request.

[Hardware Configuration]

Figure 9:
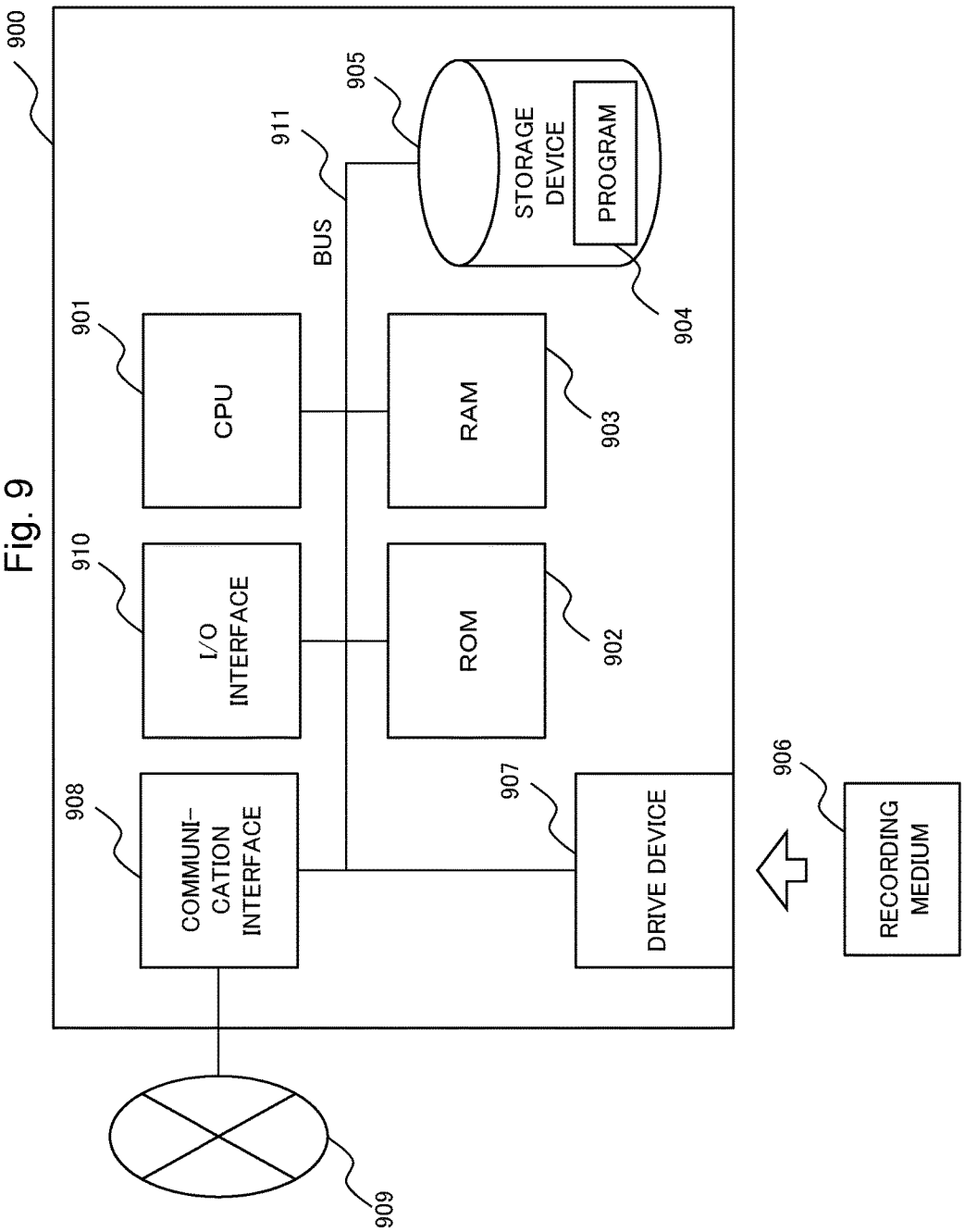
FIG. 9 is a block diagram illustrating an example of a hardware configuration of an information processing device that implements the storage system according to each example embodiment in the present disclosure.

In each example embodiment in the present disclosure, each component of each system indicates a block of a functional unit. A whole or a part of each component of each system is implemented by any combination of an information processing device 900 and a program as illustrated in FIG. 9, for example. The information processing device 900 includes components as described below, as an example.

A Central Processing Unit (CPU) 901
A Read Only Memory (ROM) 902
A Random Access Memory (RAM) 903
A program 904 loaded in the RAM 903
A storage device 905 that stores the program 904
A drive device 907 that reads and/or writes a recording medium 906
A communication interface 908 that connects to a communication network 909
An Input and/or Output (TO) interface 910 that inputs and/or outputs data
A bus 911 that connects the respective components Each component of each system according to each example embodiment is implemented by the CPU 901 acquiring and executing the program 904 that implements these functions. The program 904 that implements a function of each component of each system is stored in advance, for example, in the storage device 905 or the RAM 903. Then, the CPU 901 reads the program 904 as needed. Note that, the program 904 may be supplied to the CPU 901 via the communication network 909. Alternatively, the program 904 may be stored in advance in the recording medium 906. Then, the drive device 907 may read the program 904 and supply it to the CPU 901.

The ROM 902, the storage device 905, and the recording medium 906 are non-transitory recording media. The RAM 903 is a transitory recording medium.

A method of implementing each system has various variations. For example, each system may be implemented by any combination of the information processing device 900 and a program for each component. Alternatively, a plurality of components included in each system may be implemented by any combination of one information processing device 900 and a program.

Further, a whole or a part of each component of each system is implemented by another general-purpose or dedicated circuit, a processor, or the like, or a combination thereof. These may be configured with a single chip, or may be configured with a plurality of chips connected via a bus.

A whole or a part of each component of each system may also be implemented by a combination of the above-mentioned circuit and the like, and a program.

When a whole or a part of each component of each system is implemented by a plurality of information processing devices, a plurality of circuits, and the like, the plurality of information processing devices, the plurality of circuits, and the like may be placed in a centralized manner or a distributed manner. For example, information processing devices, circuits, and the like may be implemented as a form of being connected to one another via a communication network, such as a client and server system or a cloud computing system.

Advantageous Effects of Invention

According to the present disclosure, it is possible to decrease frequency of data communication between storages, without adding a new function to a server.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

The invention claimed is:
1. A storage system comprising:
a plurality of storage devices, wherein
each of a plurality of the storage devices including:
a control unit; and
a storage unit that stores data, wherein
the control unit of the storage device that receives a request specifies the storage device that includes the storage unit in which target data targeted by the request is stored among the storage devices, and the control unit of the storage device that is specified transmits, as a response to the request, the target data and header information in which a destination identifier indicating a destination of the request is set to a source identifier of the response, and a source identifier indicating a source of the request is set to a destination identifier of the response, wherein, when the control unit of a first storage device among the storage devices receives the request transmitted from a server device, and the storage unit of a second storage device that is different from the first storage device among the storage devices stores the target data, the control unit of the first storage device identifies the second storage device, and the control unit of the second storage device transmits, as the response, the target data and the header information in which information indicating the first storage device is set to the source identifier of the response, information indicating the server device is set to the destination identifier of the response, and information indicating the server device is set to an originator identifier that identifies an originator starting the request.

2. The storage system according to claim 1, wherein the control unit of the first storage device transmits, to the second storage device, an instruction to transfer the target data to the server device, information indicating the first storage device that is the destination of the request, information indicating the server device that is the source of the request, and the originator identifier, and the control unit of the second storage device acquires the target data from the storage unit of the second storage device based on the instruction.

3. A communicating method of a storage system that includes a plurality of storage devices, the communicating method comprising:

by a storage device that received a request, identifying the storage device having a storage unit in which target data of the request is stored among the storage devices; and by the storage device that is identified, transmitting, as a response to the request, the target data and header information in which a destination identifier indicating a destination of the request is set to a source identifier of the response, and a source identifier indicating a source of the request is set to a destination identifier of the response further comprising:

when, by a first storage device among the storage devices, receiving the request transmitted from a server device, and by the storage of a second storage device that is different from the first storage device among the storage devices, storing the target data, by the first storage device, identifying the second storage device; and by the second storage device, transmitting, as the response, the target data and the header information in which information indicating the first storage device is set to the source identifier of the response, information indicating the server device is set to the destination identifier of the response, and information indicating the server device is set to an originator identifier that identifies an originator starting the request.

4. The communicating method according to claim 3, further comprising:

by the first storage device, transmitting, to the second storage device, an instruction to transfer the target data to the server device, information indicating the first storage device that is the destination of the request, information indicating the server device that is the source of the request, and the originator identifier; and by the second storage device, acquiring the target data from the storage unit of the second storage device based on the instruction.

* * * * *